United States Patent [19]

Katano et al.

[11] Patent Number: 5,669,027
[45] Date of Patent: Sep. 16, 1997

[54] CAMERA WITH LIGHT SHIELDING BARREL AND STEPPED FILM CHAMBER DEFINING SPACE FOR FLASH CONDENSER

[75] Inventors: Yuji Katano, Kawasaki; Hiroshi Wakabayashi, Yokohama, both of Japan

[73] Assignee: Nikon Corporation, Tokyo, Japan

[21] Appl. No.: 352,214

[22] Filed: Dec. 2, 1994

Related U.S. Application Data

[63] Continuation of Ser. No. 848,920, Mar. 10, 1992, abandoned.

[30] Foreign Application Priority Data

Mar. 18, 1991 [JP] Japan ................................. 3-078651

[51] Int. Cl.$^6$ ............................................. G03B 17/02
[52] U.S. Cl. ........................................ 396/535; 396/539
[58] Field of Search ........................... 354/149.11, 173.1, 354/288, 484; 396/387, 395, 396, 439, 511, 512, 516, 535, 539

[56] References Cited

U.S. PATENT DOCUMENTS

| | | | |
|---|---|---|---|
| 3,703,129 | 11/1972 | Goshima et al. | 390/317 |
| 4,579,435 | 4/1986 | Haraguchi | 396/410 |
| 4,811,041 | 3/1989 | Tsuboi | 396/73 |
| 4,841,319 | 6/1989 | Hansen | 396/439 |
| 5,001,505 | 3/1991 | Tosaka et al. | 396/535 X |
| 5,079,584 | 1/1992 | Nakamura | 396/539 |
| 5,150,140 | 9/1992 | Kitazawa | 396/535 X |

*Primary Examiner*—Safet Metjahic
*Assistant Examiner*—J. K. Han
*Attorney, Agent, or Firm*—Shapiro and Shapiro

[57] ABSTRACT

A camera with a built-in flash light unit has a light shielding barrel of truncated cone shape and a stepped film cartridge chamber. The light shielding barrel is disposed to shield an optical path between a photographic lens at a front of the camera and a film plane at a rear of the camera, the smaller end of the truncated cone residing at the photographic lens. The cartridge chamber is provided at one side of the light shielding barrel and encloses a film cartridge having a cylinder for including a film wound therein and a feed step tangentially projecting out from a circumference of the cylinder for film feed therefrom. The cartridge chamber has a predetermined rear-to-front dimension and comprises a first room defined by a curved wall shaped to fit the cylinder and a second room connected to the first room and defined by a wall shaped to fit the feed step. The light shielding barrel and both of the cartridge chamber walls define a space between the cartridge chamber and the light shielding barrel. A power source condenser, that provides power to the flash light unit, and a film feed transmission member are disposed in the space between the cartridge chamber and the light shielding barrel within a rear-to-front dimension of the space that is within the predetermined rear-to-front dimension of the cartridge chamber.

2 Claims, 4 Drawing Sheets

CAMERA WITH LIGHT SHIELDING BARREL AND STEPPED FILM CHAMBER DEFINING SPACE FOR FLASH CONDENSER

This is a continuation of application Ser. No. 07/848,920 filed Mar. 10, 1992, now abandoned.

BACKGROUND OF THE INVENTION

1. Field of the Invention

The present invention relates to a camera with a built-in flash light unit, and in which a stepped film patrone or cartridge is loaded.

2. Related Background Art

A flash light unit built-in camera is known as having the following structure.

FIGS. 8 and 9 show an example of conventionally known flash light built-in cameras. FIG. 8 is a sectional plan view of the camera and FIG. 9 a section along a line VIII—VIII as shown in FIG. 8. Reference numeral 1 denotes a camera main body. There are a photographic lens 2 and a shutter 3 for controlling passage of optical flux passed through the photographic lens 2, provided in the front section of the camera body 1. A light shielding barrel 4 is disposed between the photographic lens 2 and a film plane. The light shielding barrel is shaped as a truncated cone a top of which is located on the side of photographic lens 2 and a bottom of which is located on the side of film plane. The light shielding barrel 4 shields external light, including the optical flux between the photographic lens 2 and film plane. A patrone or cartridge chamber 5 is formed on the left side of the light shielding barrel 4 in FIG. 8, in which a near-cylindrical film patrone 6 is loaded with a film being wound therein. In FIG. 9, reference numeral 7 denotes film feed gears connected to unrepresented power transmission means to feed the film from the film patrone 6. Numeral 8 represents a flash light power source condenser for boosting the voltage of a battery 9. The voltage stored in the condenser 8 is supplied to a flash light emitting section 10 upon a flash light photograph for emission of flash light. However, such conventional flash light unit built-in camera has the following problem. The near-cylindrical patrone chamber 5 fit to the shape of film patrone 6 is arranged as near the light shielding barrel 4 as possible to minimize the width of the camera. Thus, there is no room for the flash light power source condenser 8 between the patrone chamber 5 and the light shielding barrel 4. The condenser 8 is located between the light shielding barrel 4 and the film feed gears 7 accordingly. This arrangement increases the height of the camera.

SUMMARY OF THE INVENTION

It is, therefore, an object of the present invention to provide a camera with a built-in flash light unit and that is minimized in height while keeping its width as narrow as possible, effectively using a space inside the camera.

The present invention is applicable to such a camera comprising a light shielding barrel of truncated cone shape for shielding an optical path between a photographic lens and a film plane, a top of the truncated cone residing at the photographic lens, a cartridge chamber provided on the light shielding barrel side, a power source condenser for a flash light unit, a film cartridge enclosed in the cartridge chamber having a cylinder for including a film wound therein and a feed step tangentially projecting out from a circumference of the cylinder for film feed therefrom.

The above object of the present invention can be achieved by a camera in which the cartridge chamber comprises a first room fit to the cylinder, and a second room connected to the first room and fit to the feed step, and the power source condenser for the flash light unit is disposed in a space between the cartridge chamber and the light shielding barrel.

DETAILED DESCRIPTION OF THE PREFERRED EMBODIMENTS

Figure 1:
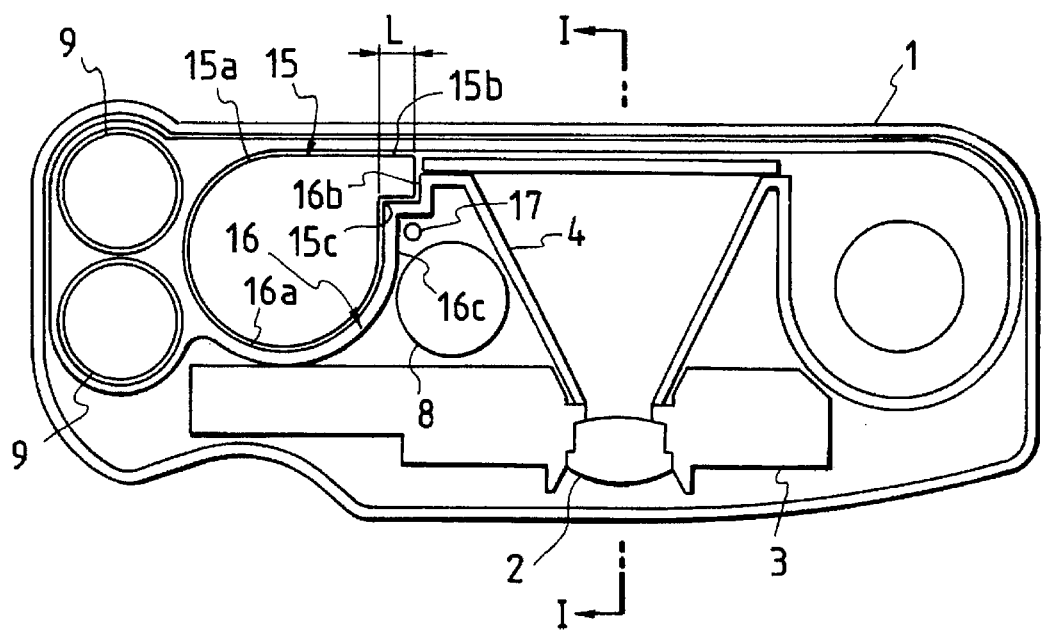
FIG. 1 is a plan view in section to show an embodiment of a flash light unit built-in camera according to the present invention.
Figure 2:
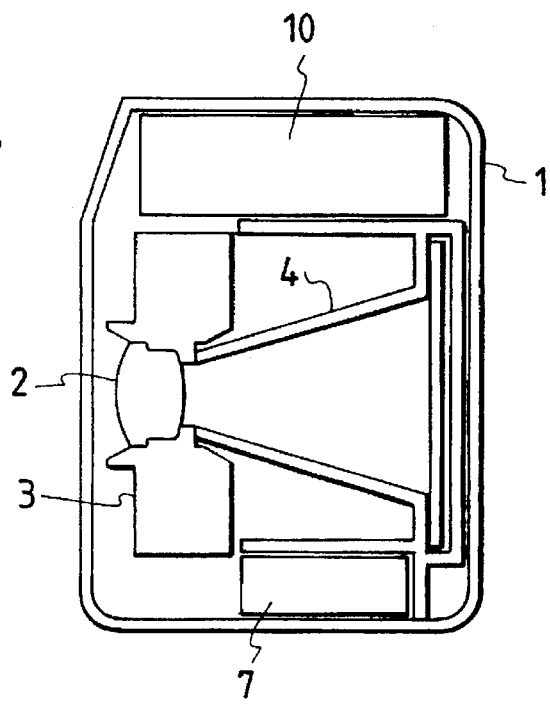
FIG. 2 is a sectional view along a line I—I as shown in FIG. 1.
Figure 3:
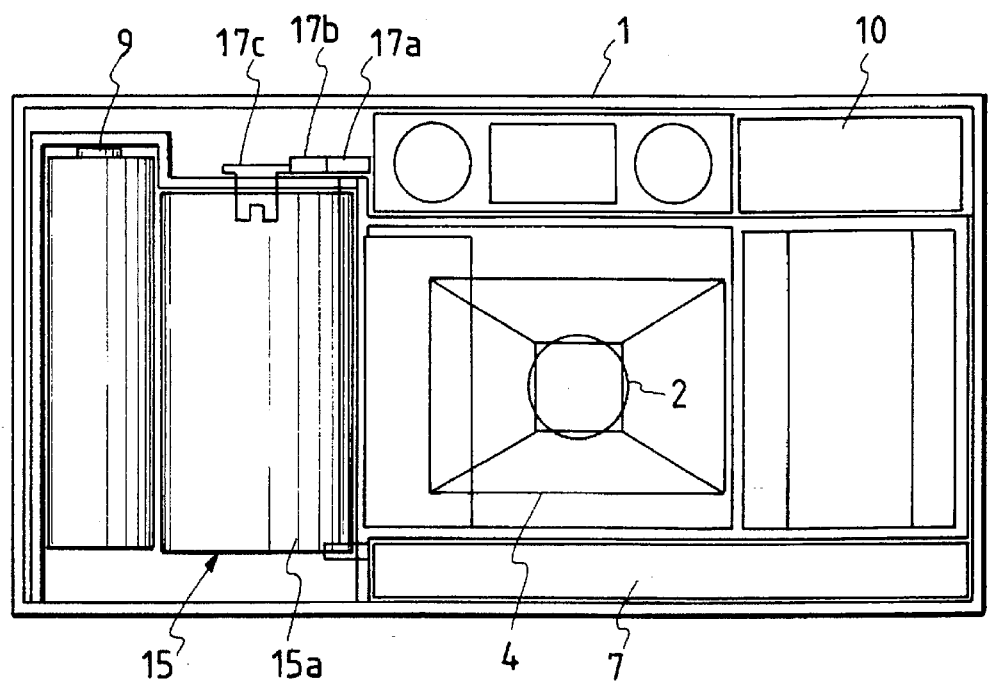
FIG. 3 is a sectional elevational view of the camera as shown in FIG. 1.
Figure 8:
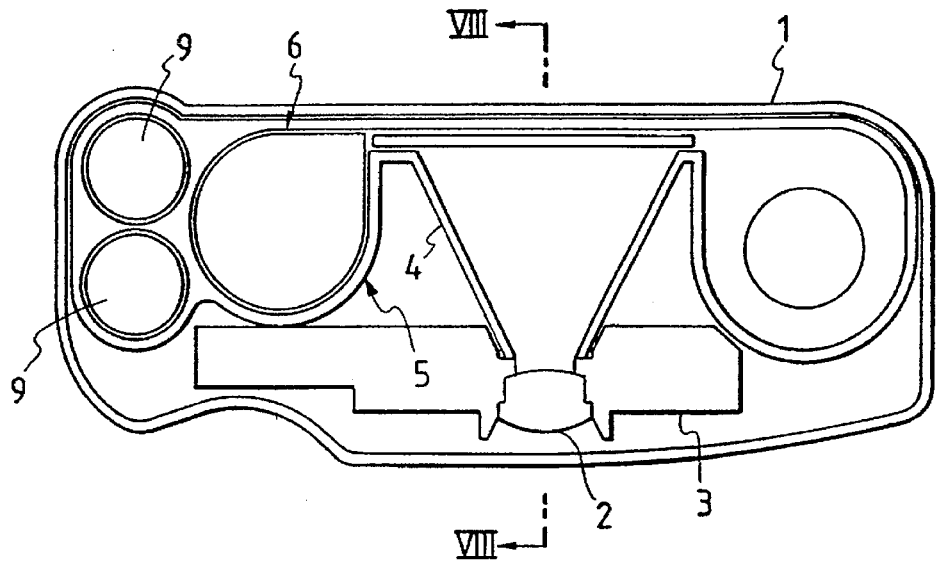
FIG. 8 is a sectional plan view to show a conventional flash light unit built-in camera.
Figure 9:
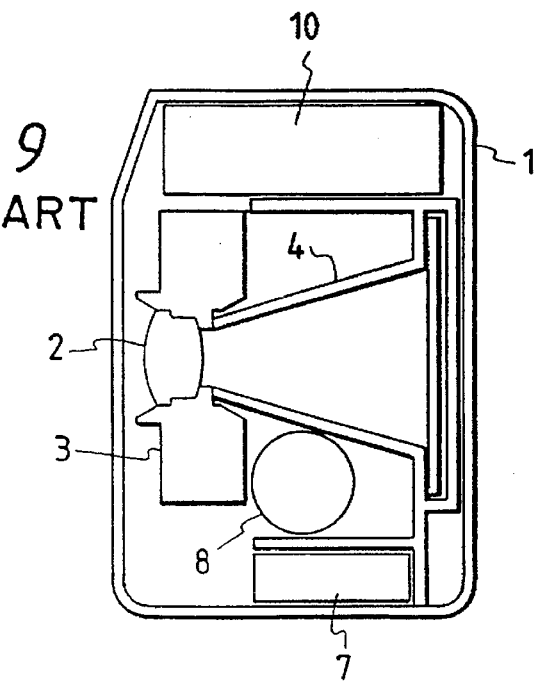
FIG. 9 is a sectional view along a line VIII—VIII as shown in FIG. 8.

Below explained with reference to FIGS. 1 to 3 is a preferred embodiment of a flash light unit built-in camera according to the present invention. The same reference numerals as in FIGS. 8 and 9 are given for similar parts, and differences will be principally explained.

In the drawings, there are disposed in a front section of a camera main body 1, a photographic lens 2, and a shutter 3 to control passage of optical flux which has passed through the photographic lens 2. A light shielding barrel 4 is disposed between the photographic lens 2 and a film plane. The light shielding barrel 4 is of a truncated cone shape a smaller end of which is on the side of photographic lens 2. The light shielding barrel 4 shields external light to enclose optical flux between the photographic lens 2 and the film plane. A patrone or cartridge chamber 16 is formed on the left side of the light shielding barrel 4, in which a near-cylindrical patrone 15 including a wound film is loaded. In FIG. 3, numeral 7 denotes film feed gears connected to unrepresented power transmission means for feeding out the film from the film patrone 15. Numeral 8 represents a flash light unit power condenser for boosting the voltage of a battery 9. The voltage stored in the condenser 8 is supplied to a flash light emitting section 10 upon flash light photograph for emission of flash light.

Figure 4:
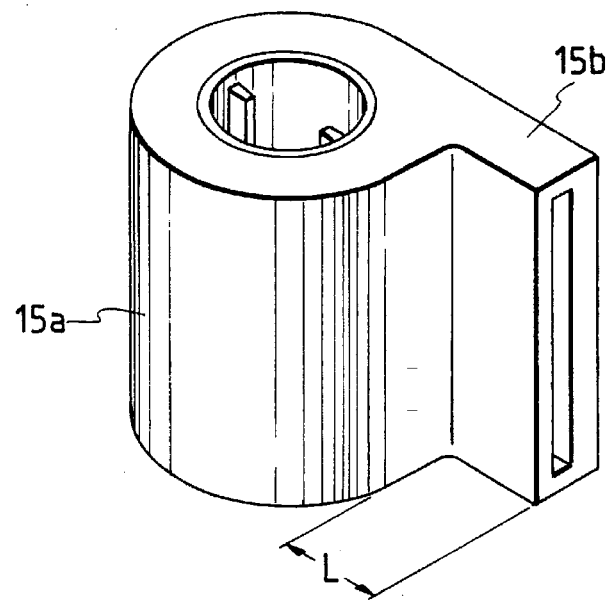
FIG. 4 is a perspective view of a film patrone.

As shown in FIG. 4, the film patrone 15 has a cylinder 15a including a wound film and a feed step 15b tangentially projecting out by a length L from a circumference of the cylinder 15a to feed out the film therefrom. The film patrone 15 is of such a type that the film is unwound out of the patrone by rotating a patrone shaft.

The patrone chamber 16 has a first room 16a defined by a wall shaped to fit a cylinder 15a of the film patrone 15, and a second room 16b connected to the first room 16a and shaped to fit the feed step 15b of the film patrone 15. Consequently, a connected part between the first room 16a and the second room 16b has a shape fitting into a recess portion 15c formed between the cylinder 15a of the film patrone 15 and the feed step 15b. As a result, a space between the first room 16a of the patrone chamber 16 and the light shielding barrel 4 is enlarged by a projection amount L of the feed step 15b of the film patrone 15, as compared to conventional flash light built-in cameras. The flash light power source condenser 8 is disposed in this enlarged space, and a transmission axle for film feed 17 further disposed in a recessed space 16c formed by the connecting portion of the first room 16a and the second room 16b.

The lower end of the transmission axle for film feed 17 is connected to the film feed gears 7 disposed down the light shielding barrel 4 as shown in FIGS. 2 and 3. A rotational drive force transmitted from the gears 7 to the film feed transmission axle 17 is further transmitted through gears 17a, 17b to a coupling 17c to rotate the patrone shaft, thereby feeding out the film in the cylinder 15a of the film patrone 15 through the feed step 15b.

As explained above, the space between the first room 16a of the patrone chamber 16 and the light shielding barrel 4 is enlarged by the length L of the feed step 15b of the film patrone 15, so that the flash light power source condenser 8 may be disposed in this space. Then it is unnecessary to locate the condenser 8 between the light shielding barrel 4 and the film feed gears 7, as is the case in the conventional cameras, which results in reduction in height of the camera main body 1. Furthermore, the film feed transmission axle 17 for transmitting the rotational drive force for the film feed may be disposed in this space, which increases an efficiency of space utilization in the camera body 1 to achieve downsizing of cameras.

Figure 5:
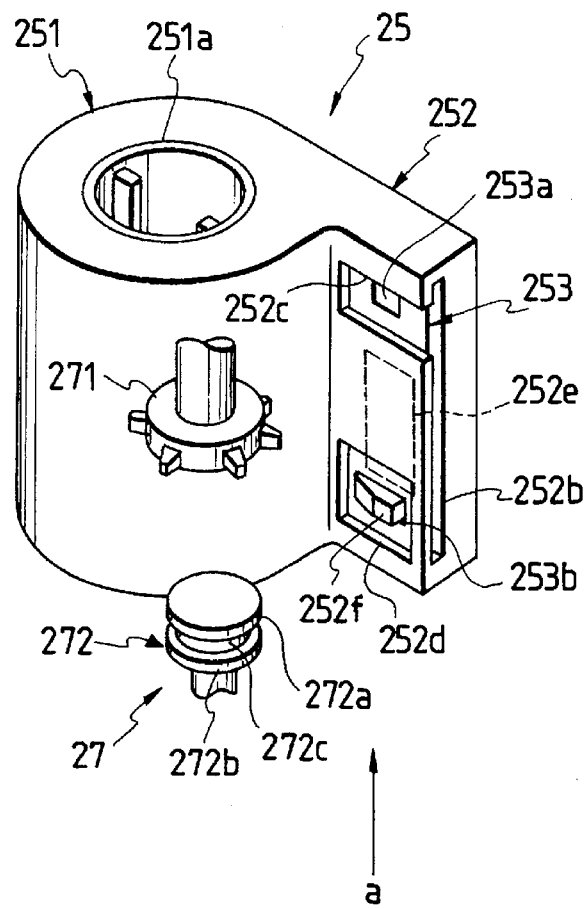
FIG. 5 is a perspective view of an embodiment of a film patrone which may be loaded in the flash light unit built-in camera according to the present invention, and a film feed mechanism.
Figure 6:
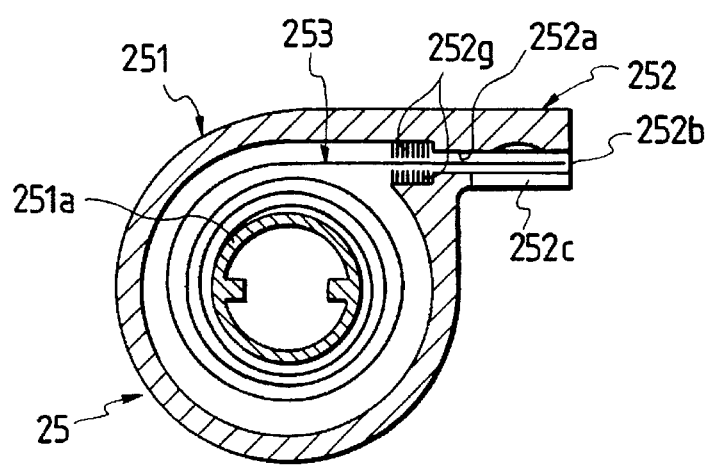
FIG. 6 is a sectional plan view of the film patrone as shown in FIG. 5.
Figure 7:
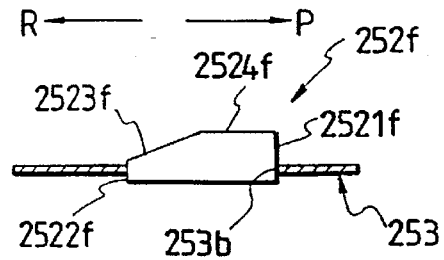
FIG. 7 is a sectional view of a portion of the film patrone as shown in FIG. 5, which is seen from a point a in FIG. 5.

FIGS. 5 to 7 show a modification of film patrone loaded in a flash light unit built-in camera according to the present invention, and an embodiment of a film feed mechanism of such camera. Parts similar to those in FIGS. 1 to 3, and 8 are denoted by the same reference numerals and differences will be principally explained.

As shown in FIG. 5, a film patrone 25 is arranged such that a roll film 253 is wound around a spool 251a at the axis of cylinder 251. A perforation 253a is provided on the upper side of screen of film 253, and a pore 253b is formed on the lower side of the leading end of film.

Further, a feed step 252 is connected to the cylinder 251 of the film patrone 25 as shown in FIG. 6. A film feed path 252a is formed in the feed step 252. Again in FIG. 5, a film drawing slit 252b is formed at the top of the feed step 252, and a sprocket interlocking opening 252c and a release roller interlocking opening 252d on the side wall.

Numeral 27 is a film feed mechanism disposed in the space between the patrone chamber 16a and the light shielding barrel 4 not shown, which is provided with a film feed sprocket 271 and a release roller 272. The film feed sprocket 271 fits into the opening 252c, the sprocket 271 is coupled with the perforation 253a of the film 253, and the film 253 is fed out by rotation of the sprocket 271.

Also, a stop 252f is provided to face the opening 252d, and urged to project towards the opening 252d by a plate spring 252e from the back thereof. The stop 252f is coupled with the pore 253b formed at the leading end of the film 253, so that it may prevent the film 253 from unexpectedly being withdrawn into the patrone cylinder 251 before photographing or upon a film winding after photographing. The release roller 272 enters the opening 252d upon loading of film patrone 25 in the camera, to press the stop 252f. In detail, the release roller 272 is a stepped roller as shown in FIG. 5, having large disk portions 272a, 272b and a small disk portion 272c. The large disk portions 272a, 272b contact with the film 253, and the small disk portion 272c presses the stop 252f. The motion of the stop 252f by the release roller 272 controls winding and unwinding of film 253.

Further, a light shielding member 252g is provided at the connection between the cylinder 251 and the feed step 252 as shown in FIG. 6, to shield the inside of cylinder 251.

A shape of the stop 252f will be below explained with reference to FIG. 7. FIG. 7 shows the stop 252f and the film 253 seen from the point a in FIG. 5, in which P represents a direction of film unwinding and R a direction of film winding. As shown in FIG. 7, the stop 252f is a rectangular solid, having a film winding stop face 2521f on the right side in FIG. 7, film unwinding stop face 2522f on the left side in FIG. 7, a slope face 2523f ascending from the film unwinding stop face 2522f in the direction of film unwinding, and a press face 2524f pressed by the release roller 272 to contact the film 253 during the film unwinding and winding.

When the film patrone 25 is loaded into the camera with the film 253 being coupled with the stop 252f, the release roller 272 enters the opening 252d so that the large disk portions 272a, 272b contact with the film 253 and the small disk portion 272c presses backward the press face 2524f of the stop 252f against the urging force of the plate spring 252e. In this state, once the sprocket 271 starts rotating for film feed, the film 253 is fed in the unwinding direction P. Since the stop 252f is provided with the slope face 2523f, the film may be fed in a smooth manner without the pore 253b of the film 253 being caught.

At the end of feed of the film 253 photographed, the spool 251a is rotated by an unrepresented mechanism in the camera to wind up the film 253. The motion of film 253 is stopped just before the end of winding by entrance of the stop 252f into the pore 253b. Then the film 253 after being wound is kept in the same condition as before being loaded in the camera.

Also in the second embodiment, the film feed mechanism 27 is disposed in the space between the patrone chamber 16a and the light shielding barrel 4, thereby achieving downsizing of cameras similarly.

The film feed power transmission means is composed of the film feeding transmission axle 17 and the sprocket 271 in the respective embodiments as above described.

According to the present invention, the patrone chamber is shaped to fit the film patrone having the feed step, and the flash light power source condenser and film feed power transmission means are disposed between the patrone chamber and the light shielding barrel, so that the storage space is unnecessary for the flash light power source condenser below the light shielding barrel, decreasing the height of camera, consequently. Also, since the efficiency of space utilization is increased in the camera body, the camera may be made compact.

What is claimed is:

1. A camera with a built-in flash light unit, comprising:
   a light shielding barrel of truncated cone shape that is disposed to shield an optical path between a photographic lens at a front of the camera and a film plane at a rear of the camera, a smaller end of said truncated cone residing at the photographic lens;
   a cartridge chamber provided at one side of the light shielding barrel;
   a power source condenser that provides power to the flash light unit;

a film cartridge enclosed in said cartridge chamber having a cylinder for including a film wound therein and a feed step tangentially projecting out from a circumference of the cylinder for film feed therefrom;

wherein said cartridge chamber comprises a first room defined by a curved wall shaped to fit to said cylinder, and a second room connected to said first room and defined by a wall shaded to fit to said feed step, said cartridge chamber having a predetermined rear-to-front dimension, said light shielding barrel and both of said cartridge chamber walls defining a space between the cartridge chamber and the light shielding barrel, said wall shaped to fit said feed step providing increased space for placement of said power source condenser; and wherein said power source condenser and a film feed transmission member are disposed in said space between said cartridge chamber and said light shielding barrel within a rear-to-front dimension of said space that is within said predetermined dimension of said cartridge chamber.

2. A camera according to claim 1, wherein said camera is of a type in which said photographic lens has a shutter associated therewith.

* * * * *